United States Patent [19]

Fowler et al.

[11] Patent Number: 5,229,686
[45] Date of Patent: Jul. 20, 1993

[54] MERCURY VAPOR DISCHARGE LAMP CONTAINING MEANS FOR REDUCING MERCURY LEACHING

[75] Inventors: Richard A. Fowler, Ipswich; Robert P. Bonazoli, Hamilton, both of Mass.

[73] Assignee: GTE Products Corporation, Danvers, Mass.

[21] Appl. No.: 773,834

[22] Filed: Oct. 9, 1991

[51] Int. Cl.$^5$ .............................................. H01J 61/00
[52] U.S. Cl. ...................... 313/565; 313/318; 313/485; 313/490; 445/2; 445/61; 445/73
[58] Field of Search ............... 313/490, 565, 485, 546, 313/493, 318, 642; 445/2, 61, 73

[56] References Cited

U.S. PATENT DOCUMENTS

| | | | |
|---|---|---|---|
| 3,392,298 | 7/1968 | Menelly | 313/109 |
| 3,781,586 | 12/1973 | Johnson | 313/565 |
| 4,268,306 | 5/1981 | Björkman | 75/81 |
| 4,319,157 | 3/1982 | De Vrijer | 313/642 |
| 4,423,349 | 12/1983 | Nakajima et al. | 313/485 |
| 4,435,284 | 3/1984 | Heytmeijer | 209/3 |
| 4,469,980 | 9/1984 | Johnson | 313/493 |
| 4,715,838 | 12/1987 | Kulander | 445/61 |

FOREIGN PATENT DOCUMENTS 58-184558  10/1983  Japan .

OTHER PUBLICATIONS

Federal Register, pp. 26987–26998, vol. 55, No. 126, Jun. 29, 1990.
Experimental Electrochemistry For Chemists, pp. 303–304, 1974.
The Condensed Chemical Dictionary, p. 434, 1961.
Glossary of Chemical Terms, p. 6, 1982.

Primary Examiner—Donald J. Yusko
Assistant Examiner—N. D. Patel
Attorney, Agent, or Firm—Carlo S. Bessone

[57] ABSTRACT

A mercury vapor discharge lamp (e.g., a fluorescent lamp) having an envelope containing an inert starting gas and a quantity of elemental mercury at least partially convertible to soluble mercury. Enclosed within the lamp is an amount of chemical agent suitable for chemically combining a substantial portion of the soluble mercury as a sparingly soluble salt when the lamp is pulverized as a result of disposal. In one embodiment, the chemical agent is potassium periodate which is sealed within a enclosure which is rupturable upon pulverization of the lamp. The sealed enclosure may be disposed within the envelope or external to the envelope, such as within a cavity defined by a lamp base. In another embodiment, the chemical agent is mixed with the basing cement used to secure one or more of the the lamp bases to the envelope.

9 Claims, 1 Drawing Sheet

MERCURY VAPOR DISCHARGE LAMP CONTAINING MEANS FOR REDUCING MERCURY LEACHING

CROSS-REFERENCE TO A RELATED APPLICATION

This application discloses, but does not claim, inventions which are claimed in U.S. patent application Ser. No. 07/773,835 filed concurrently herewith and assigned to the Assignee of this application.

FIELD OF THE INVENTION

This invention relates in general to mercury vapor arc discharge lamps and pertains, more particularly, to a fluorescent lamp which contains a chemical agent for substantially reducing the amount of soluble mercury measurable after pulverization of the lamp.

BACKGROUND OF THE INVENTION

Fluorescent lamps are well known in the art and are characterized as low pressure arc discharge lamps which include a pair of electrodes sealed in an elongated envelope whose interior surface is coated with phosphor. The envelope contains a quantity of mercury and a rare gas at a reduced pressure, for example, in the order of 1-5 torr.

During lamp manufacture, about 10-40 milligrams of elemental mercury is sealed in each fluorescent lamp. It is known that most of this mercury adheres to the phosphor coating with only a very small portion of the mercury being in the form of mercury vapor. After the alkali earth metal oxides coating the lamp electrodes are volatized, the oxides decompose in the discharge space and the freed oxygen converts some of this elemental mercury to a salt or compound such as mercuric oxide (HgO) which is highly soluble.

There is a growing concern that a waste stream resulting from the disposal of fluorescent lamps may leach excessive amounts of this soluble form of mercury. One method of measuring the amount of soluble mercury which may leach from the waste stream resulting from the disposal of fluorescent lamps is described in the Toxicity Characteristic Leaching Procedure (TCLP) prescribed on pages 26987-26998 of volume 55, number 126 of the Jun. 29, 1990 issue of the Federal Register. According to the procedure, the lamp being tested is pulverized into granules having a surface area per gram of material equal to or greater than 3.1 cm$^2$ or having a particle size smaller than 1 cm in its narrowest dimension. Following pulverization, the granules are subjected to a sodium acetate buffer solution having a pH of approximately 4.93 and having a weight twenty times the weight of the granules.

At the present time, the Environmental Protection Agency defines a maximum concentration level for mercury at 0.2 milligram leachable mercury per liter extract fluid when the TCLP is applied. According to present standards, a fluorescent lamp is considered non leachable when less than 0.2 milligram per liter of leachable mercury results from a TCLP extraction.

Various methods have been proposed which attempt to treat or process burned-out discharge lamps or scrap lamp exhaust tubing containing mercury in order to reclaim the mercury and thereby reduce the amount of mercury-contaminated scrap glass. For example, U.S. Pat. No. 4,268,306 (Björkman) discloses a treatment whereby the expanded or scrapped lamps are crushed into fragments which are then placed in a treatment vessel in which the mercury is recovered by distillation processes. This treatment is carried out batchwise in a sealed container into which nitrogen is introduced. The container is heated and placed under vacuum so as to vaporize the mercury. The vaporized mercury is then removed from the container through a bottom outlet and condensed in a cooling trap. It is apparent that following the process, the treated lamp fragments (i.e., glass and phosphor) may be dumped without concerns about mercury leaching.

U.S. Pat. No. 4,715,838 (Kulander) teaches a method and apparatus for recovering the luminescent material from mercury vapor electric discharge lamps whereby the amount of lamp waste requiring treatment in the distillation chamber can be reduced thereby increasing the capacity of the chamber with respect to the number of lamps. After the ends of the lamp bulb or tube are separated from the intermediate bulb, the luminescent material is loosened from the inner wall surface of the bulb part with the aid of a stripping device which is arranged to be inserted into the bulb part from one end thereof. The loosened material is collected with the aid of a suction device connected to the other end of the bulb part and thereafter may be introduced into the distillation chamber, thereby obviating the need to fill the chamber with the residual "clean" glass bulb.

Japanese Patent Application No. 58-184558 (Kitsugi et al) teaches a method for solidifying discarded fluorescent lamps and insolubilizing the mercury contained therein The method involves adding sulfur to crushed fluorescent lamp waste in the proportion of 0.1-5 parts by weight per 100 parts by weight of the discard. The result is placed into a ball mill and pulverized an amount of time sufficient to produce granules with sizes 5 millimeters or less. Cement and water were added and the result is kneaded The kneaded material prepared in this way is put into molds so as to form a stabilized solidified material having a mercury concentration of less than 0.005 milligram per liter water.

U.S. Pat. No. 4,435,284 (Heytmeijer) teaches a process for removing residual mercury from scrap fluorescent lamp exhaust tubulation or similar scrap glass. A very small predetermined amount of finely divided silica or alumina powder is added to the mercury contaminated scrap glass and the mixture is agitated for a very short predetermined time during which the mercury is stripped from the tubulation. The separated mercury, powder and glass mixture is then decanted through a screen of suitable mesh to remove the separated mercury and powder from the glass and the mercury is then rinsed with a suitable solvent to remove the oxide powder from the mercury.

While these processes may be effective in separating mercury from lamp fragments or scrap glass or for insolubilizing the mercury contained in discarded fluorescent lamps, each process requires treatment equipment which may be relatively expensive.

SUMMARY OF THE INVENTION

It is, therefore, an object of the present invention to obviate the disadvantages of the prior art.

It is still another object of the invention to provide a mercury vapor discharge lamp which can be considered non leaching upon disposal.

It is another object of the invention to provide a mercury vapor discharge lamp which can be disposed of without prior expensive treatment to reclaim mercury.

These objects are accomplished in one aspect of the invention by the provision of a mercury vapor discharge lamp having an envelope of light-transmitting vitreous material containing an inert starting gas and a quantity of elemental mercury at least partially convertible to soluble mercury. First and second electrodes are located within the envelope for establishing an arc discharge therebetween. An effective amount of a chemical agent suitable for chemically combining a substantial portion of the soluble mercury as a sparingly soluble salt when the lamp is pulverized to granules and subjected to a suitable aqueous acid solution is located within the lamp. Preferably, the sparingly soluble salt is soluble to less than 0.2 milligram per liter mercury.

In accordance with further teachings of the present invention, the chemical agent is a salt selected from the group of anions consisting of bromide, chloride, iodide, iodate, periodate, sulfide, tartrate, thiosulfate and tungstate. In a preferred embodiment, the chemical agent comprises approximately 3.45 grams of potassium periodate.

In accordance with further aspects of the present invention, the lamp further includes a sealed enclosure (e.g., glass) for containing the chemical agent. The sealed enclosure is disposed within the envelope or external to the envelope, such as with a cavity defined by a lamp base member. The sealed enclosure is rupturable upon pulverization of the lamp.

In accordance with still further aspects of the present invention, the chemical agent is mixed with the basing cement used to secure one or more of the lamp bases to the lamp envelope.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein.

BEST MODE FOR CARRYING OUT THE INVENTION

For a better understanding of the present invention, together with other and further objects, advantages and capabilities thereof, reference is made to the following disclosure and appended claims in connection with the above-described drawings.

To overcome the disadvantages mentioned above with respect to the prior art, the present invention provides a method of rendering the mercury in a mercury vapor discharge lamp non leachable upon disposal without necessitating the need for relatively expensive treatment equipment as discussed above. More specifically, the invention prevents leaching of mercury as measured by TCLP by the incorporation of a substance (i.e., materials or agents) in the lamp construction which renders the mercury non leachable upon disposal. In accordance with the teachings of the present invention, these substances comprise chemical agents (i.e., elements, compounds or combinations thereof) which will chemically combine with the soluble mercury produced during lamp operation to form a sparingly soluble salt.

In one embodiment, the chemical agent is located "effectively remote" from the arc discharge so as not to interfere with the discharge or the operation of the lamp. One suitable method for disposing the chemical agent "effectively remote" from the discharge is to contain the chemical agent within a sealed enclosure within the lamp envelope. Alternatively, the chemical agent may be disposed remote from the arc discharge by disposing the chemical agent within one or more of the lamp bases. In the latter instance, the chemical agent may be located within a cavity formed by the lamp base or may be mixed with the basing cement used to secure the lamp base(s) to the envelope. If the chemical agent is placed within the base cavity, the chemical agent may be further contained within a sealed enclosure secured to an inner surface of the base.

Figure 1:
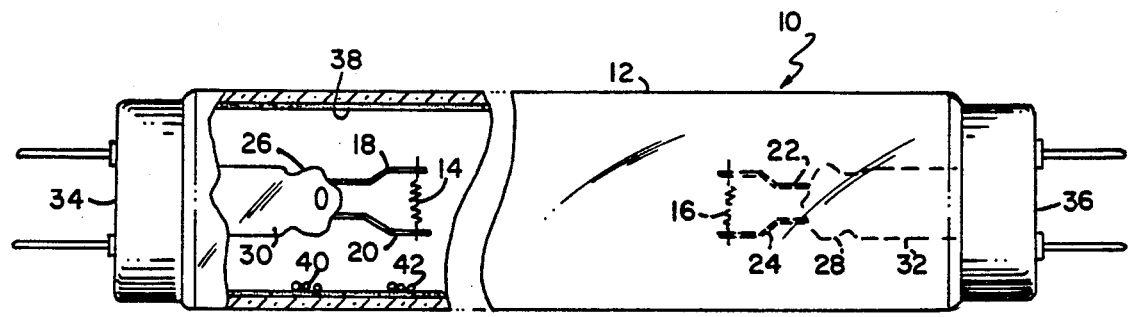
FIG. 1 represents a front elevational view, partially broken away, of a mercury vapor discharge lamp according to the present invention.

Referring to the drawings with greater particularity, there is illustrated in FIG. 1 a mercury vapor discharge lamp 10, such as a fluorescent lamp, comprising an elongated sealed envelope 12 of light-transmitting vitreous material. Envelope 12 is filled with an inert gas such as argon at a low pressure, for example two torr, and a quantity of mercury 40, at least enough to provide a low vapor pressure of about six microns during operation. An electrode 14 and 16 is disposed at each end of envelope 12 supported by lead-in wires 18, 20, and 22, 24, respectively Electrodes 14 and 16 are coated with electron-emitting materials such as BaO-SrO-CaO containing $MgZrO_3$. The lead-in wires extend through stem presses 26, 28 in mount stems 30, 32 to the contacts in base members 34, 36 secured to the ends of envelope 12.

A phosphor coating 38 is disposed on the interior surface of envelope 12. Phosphor coating 38, which may be a halophosphate phosphor such as Cool White, is responsive to the ultraviolet radiation generated by the arc discharge established between electrodes 14, 16 to provide a desired emission spectrum.

During lamp manufacture, about 10-40 milligrams of elemental mercury is sealed in each fluorescent lamp. During lamp life, most of this mercury adheres to the phosphor coating with only a very small portion of the mercury being in the form of mercury vapor. After the alkali earth metal oxides coating the lamp electrodes are volatized, the oxides decompose in the discharge space and the freed oxygen converts some of this elemental mercury to a salt or compound such as mercuric oxide (HgO) which is highly soluble.

In accordance with the teaching of the present invention, located within the lamp is an effective amount of a chemical agent 42 suitable for chemically combining a substantial portion of the soluble mercury available within the lamp as a sparingly soluble salt measurable when the lamp is pulverized to granules and subjected to a suitable aqueous acid solution. Evidence of a substantial portion of the soluble mercury having been reduced is apparent when the amount of soluble mercury is less than 0.2 milligram per liter of the aqueous acid solution.

Soluble mercury is produced during lamp operation and during TCLP as the result of the action of elemental mercury with other metals found in the lamp (e.g., lead wires and metal bases). The chemical agent is generally an element, compound or combinations thereof which precipitate ionic mercury as a sparingly soluble salt, i.e., a salt soluble to less than 0.2 milligram per liter mercury when the lamp waste is subjected to twenty times its weight of the sodium acetate buffer solution. Examples of suitable chemical agents are salts selected from the group of anions consisting of bromide, chloride, iodide, iodate, periodate, sulfide, tartrate, thiosulfate and tungstate.

Figure 2:
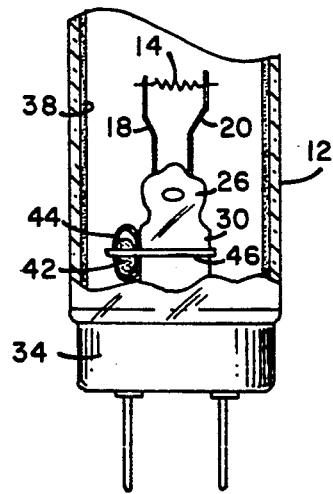
FIG. 2 is a perspective view of a portion of a mercury vapor discharge lamp according to one embodiment of the invention.
Figure 3:
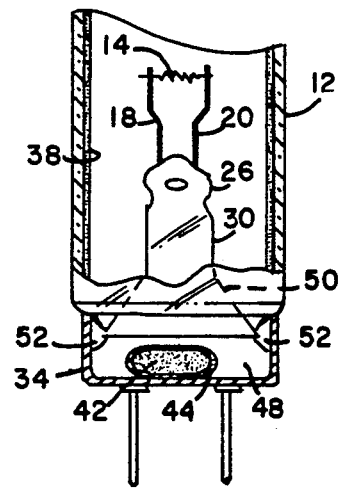
FIG. 3 is a perspective view of a portion of a mercury vapor discharge lamp according to another embodiment of the invention.

Referring next to FIGS. 2 and 3, there are shown two preferred embodiments of the present invention, wherein several of the same constituent members as those in FIG. are denoted by the same reference numerals. In the first embodiment as illustrated in FIG. 2, chemical agent 42 is contained in a sealed enclosure or vial 44 disposed within lamp envelope 12. The sealed enclosure is formed from a material which is easily rupturable when the lamp is crushed for disposal in a landfill or to meet the size reduction required by TCLP. Rupture of the sealed enclosure facilitates dispersion of the chemical agent with the lamp granules. Glass is a suitable material for sealed enclosure 44.

In order to prevent movement of the sealed enclosure within the lamp envelope, sealed enclosure 44 containing chemical agent 42 may be secured to mount stem 30 by a suitable means In FIG. 2, a securing wire or strap 46 is wrapped around mount stem 30 and sealed enclosure 44.

In the second embodiment as illustrated in FIG. 3, sealed enclosure 44 containing chemical agent 42 is disposed external to envelope 12 and within a cavity 48 formed by base member 34. To prevent movement within the base member, the sealed enclosure may be secured to an inner surface of the base member by a suitable means such as an epoxy or cement (not shown).

Sealing the chemical agent within the enclosure 44 facilitates handling of the material during manufacturing and insures that the active material remains contained during normal lamp life. Moreover, in the embodiment illustrated in FIG. 2, the sealed enclosure prevents the active material from adversely affecting the arc discharge or the phosphor coating during lamp operation.

It is within the scope of the invention to dispose the chemical agent in locations other than those shown in the drawings. For example, it is possible to locate the sealed enclosure containing the chemical agent at a location 50 (FIG. 3) within mount stem 30. Alternatively, the chemical agent may include an alloy from which the base member is made or a coating of the chemical agent on a surface of at least one of the lamp base members 34, 36. The chemical agent may also be incorporated with the adhesive or basing cement 52 (FIG. 3) used to secure one or more of the base members 34, 36 to lamp envelope 12 Finally, the chemical agent may be disposed at more than one location within the lamp.

In a typical but non-limitative example of a mercury vapor discharge lamp in accordance with the teachings of the present invention, a new 40-watt Cool White fluorescent lamp in the presence of 3.45 grams of potassium periodate is pulverized until all pieces pass a 9.5 millimeter screen. These pieces are then combined with 5.6 liters of sodium acetate buffer solution of pH 4.90. The resulting mixture is thoroughly mixed and allowed to stand 18 hours. The resulting solution is filtered through a binderless borosilicate glass bed filter of nominal 0.7 micron pore size. The resulting solution is analyzed by cold vapor atomic absorption spectrometry for soluble mercury content. In the above example, the soluble mercury was found to be less than 0.01 milligram per liter. Typical TCLP results obtained on similar lamps but not containing an effective amount of a chemical agent as described by the present invention range from 0.3 mg/L Hg to 2.3 mg/L Hg.

There has thus been shown and described a mercury vapor discharge lamp containing a chemical agent for substantially reducing the amount of soluble mercury measurable after pulverization of the lamp. The invention provides a discharge lamp which can be disposed of in a landfill without prior expensive treatment to reclaim mercury.

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The actual scope of the invention is intended to be defined in the following claims when viewed in their proper perspective based on the prior art.

What is claimed is:

1. In a mercury vapor discharge lamp having an envelope of light-transmitting vitreous material containing an inert starting gas and a quantity of elemental mercury at least partially convertible to soluble mercury, first and second electrodes located within said envelope for establishing an arc discharge therebetween, the improvement comprising: an effective amount of a chemical agent located within said lamp so as not to interfere with the arc discharge or the operation of the lamp, said chemical agent chemically combining a portion of said soluble mercury as a sparingly soluble salt when said lamp is pulverized to granules and subjected to a suitable aqueous acid solution, said chemical agent being in an amount such that said sparingly soluble salt is soluble to less than 0.2 milligram per liter mercury.

2. The mercury vapor discharge lamp of claim 1 wherein said chemical agent is a salt selected from the group of anions consisting of bromide, chloride, iodide, iodate, periodate, sulfide, tartrate, thiosulfate and tungstate.

3. The mercury vapor discharge lamp of claim 2 wherein said chemical agent comprises potassium periodate.

4. The mercury vapor discharge lamp of claim 3 wherein said potassium periodate has a weight of approximately 3.45 grams.

5. The mercury vapor discharge lamp of claim 1 wherein said chemical agent is contained within a sealed enclosure, said sealed enclosure being rupturable upon pulverization of said lamp.

6. The mercury vapor discharge lamp of claim 5 wherein said sealed enclosure is disposed within said envelope.

7. The mercury vapor discharge lamp of claim 5 further comprising at least one base member secured to said envelope and defining a cavity, said sealed enclosure containing said chemical agent being disposed within said cavity of said base member.

8. The mercury vapor discharge lamp of claim 5 wherein said sealed enclosure containing said chemical agent is glass.

9. The mercury vapor discharge lamp of claim 1 wherein said lamp comprises at least one base member secured to said envelope with basing cement means, said chemical agent being mixed with said basing cement means.

* * * * *